United States Patent
Yamato et al.

(10) Patent No.: US 7,739,544 B2
(45) Date of Patent: Jun. 15, 2010

(54) DISK ARRAY SYSTEM AND REBUILD METHOD THEREOF

(75) Inventors: Junichi Yamato, Tokyo (JP); Yoshihiro Kajiki, Tokyo (JP)

(73) Assignee: NEC Corporation, Toyko (JP)

( * ) Notice: Subject to any disclaimer, the term of this patent is extended or adjusted under 35 U.S.C. 154(b) by 790 days.

(21) Appl. No.: 11/369,736

(22) Filed: Mar. 8, 2006

(65) Prior Publication Data

US 2006/0206753 A1 Sep. 14, 2006

(30) Foreign Application Priority Data

Mar. 10, 2005 (JP) ............... 2005-067125

(51) Int. Cl.
*G06F 11/00* (2006.01)
(52) U.S. Cl. .............................. 714/7; 714/6
(58) Field of Classification Search ........ 714/6, 714/7
See application file for complete search history.

(56) References Cited

U.S. PATENT DOCUMENTS

| | | | | |
|---|---|---|---|---|
| 5,357,509 A * | 10/1994 | Ohizumi | ................ | 714/7 |
| 5,487,160 A * | 1/1996 | Bemis | ................ | 711/114 |
| 5,644,696 A * | 7/1997 | Pearson et al. | ................ | 714/6 |
| 5,941,993 A * | 8/1999 | Tanaka et al. | ................ | 714/6 |
| 5,941,994 A * | 8/1999 | DeKoning et al. | ................ | 714/7 |
| 5,961,652 A * | 10/1999 | Thompson | ................ | 714/6 |
| 6,148,414 A * | 11/2000 | Brown et al. | ................ | 714/9 |
| 6,598,174 B1 * | 7/2003 | Parks et al. | ................ | 714/6 |
| 6,647,514 B1 * | 11/2003 | Umberger et al. | ............ | 714/42 |
| 6,892,276 B2 * | 5/2005 | Chatterjee et al. | ............ | 711/114 |
| 6,912,630 B1 * | 6/2005 | Pillai et al. | ................ | 711/162 |
| 6,959,413 B2 * | 10/2005 | Humlicek et al. | ............ | 714/807 |
| 7,000,142 B2 * | 2/2006 | McCombs | ................ | 714/6 |
| 7,010,720 B2 * | 3/2006 | Maeda et al. | ................ | 714/7 |
| 7,028,216 B2 * | 4/2006 | Aizawa et al. | ................ | 714/7 |
| 7,058,762 B2 * | 6/2006 | Patterson et al. | ............ | 711/114 |
| 7,139,931 B2 * | 11/2006 | Horn | ................ | 714/6 |
| 7,143,308 B2 * | 11/2006 | Tseng et al. | ................ | 714/6 |
| 7,206,991 B2 * | 4/2007 | Chatterjee et al. | ............ | 714/770 |
| 7,222,257 B1 * | 5/2007 | Dibb | ................ | 714/6 |
| 7,260,739 B2 * | 8/2007 | Burton et al. | ................ | 714/6 |
| 7,287,182 B2 * | 10/2007 | Tanaka et al. | ................ | 714/7 |
| 7,302,608 B1 * | 11/2007 | Acharya et al. | ................ | 714/13 |
| 7,313,721 B2 * | 12/2007 | Ashmore | ................ | 714/7 |
| 7,337,270 B2 * | 2/2008 | Tseng | ................ | 711/114 |
| 7,337,351 B2 * | 2/2008 | Zane et al. | ................ | 714/6 |
| 7,363,532 B2 * | 4/2008 | Ali et al. | ................ | 714/6 |
| 7,490,270 B2 * | 2/2009 | Cherian | ................ | 714/42 |
| 7,529,965 B2 * | 5/2009 | Ikeuchi et al. | ................ | 714/5 |

(Continued)

FOREIGN PATENT DOCUMENTS

JP 2002-108571 A 4/2002

(Continued)

*Primary Examiner*—Robert Beausoliel
*Assistant Examiner*—Joshua P Lottich
(74) *Attorney, Agent, or Firm*—Sughrue Mion, PLLC

(57) ABSTRACT

Disclosed is a disk array system which includes a plurality of disks constituting a disk array and a backup storage for backing up data in the disk array and performs control so that when a failed disk among the disks constituting the disk array is replaced with the replacement disk, restoration of data in the replacement disk is performed using the backup device.

22 Claims, 10 Drawing Sheets

U.S. PATENT DOCUMENTS

| | | | |
|---|---|---|---|
| 7,543,178 B2 * | 6/2009 | McNeill et al. | 714/6 |
| 7,631,218 B2 * | 12/2009 | Daikokuya et al. | 714/6 |
| 2002/0133741 A1 * | 9/2002 | Maeda et al. | 714/7 |
| 2004/0078663 A1 | 4/2004 | Inaba | |
| 2004/0225913 A1 * | 11/2004 | Hori | 714/6 |
| 2004/0230742 A1 * | 11/2004 | Ikeuchi et al. | 711/112 |
| 2004/0236986 A1 * | 11/2004 | Ng | 714/7 |
| 2005/0022051 A1 * | 1/2005 | Zane et al. | 714/6 |
| 2005/0102552 A1 * | 5/2005 | Horn | 714/6 |
| 2005/0114728 A1 * | 5/2005 | Aizawa et al. | 714/6 |
| 2005/0166087 A1 * | 7/2005 | Gorobets | 714/7 |
| 2006/0041793 A1 * | 2/2006 | Cherian et al. | 714/47 |
| 2006/0161805 A1 * | 7/2006 | Tseng et al. | 714/6 |
| 2007/0101187 A1 * | 5/2007 | Daikokuya et al. | 714/6 |

FOREIGN PATENT DOCUMENTS

| | | |
|---|---|---|
| JP | 2004-38290 A | 2/2004 |

* cited by examiner

DISK ARRAY SYSTEM AND REBUILD METHOD THEREOF

FIELD OF THE INVENTION

The present invention relates to a redundant disk array system. More specifically, the invention relates to a disk array system and a rebuild method thereof.

BACKGROUND OF THE INVENTION

Disk arrays are also referred to as RAIDs (Redundancy Arrays of Independent (Inexpensive) Disks) and have a configuration in which a plurality of disks are arranged in an array form. By appending redundancy data to data, reliability of the disk array is improved. The RAID includes a RAID0 in which by striping, for example, a plurality of disks are used as if it were one disk, a RAID1 in which using mirroring, the same data is written to a plurality of disks, a RAID5 in which by recording data and parities on a plurality of disks, fault tolerance is improved, and the like. Among these disks, in the RAID5, parity information for error correction is generated when the data is written to the disks. This parity information is distributed across and written to the disks with the remaining data by the striping. The number of the disks required for the parities is set to one. With this arrangement, even if one disk has failed, the data can be restored using the data and the parities in the remainder of the disks.

When a RAID controller detects a failure of a disk in conventional disk arrays, the conventional disk arrays have a function of performing replacement to a spare disk and rebuilding (rebuilding) data on the failed disk onto the replacement disk. On that occasion, using disks other than the replaced disk among plural disks constituting the disk array, data on the replacement disk is prepared.

In a disk array system for which high availability is required, it is necessary to rebuild data onto a replacement disk after replacement of a failed disk, in parallel with a normal operation (unless the normal operation is performed at the time of rebuilding, business is disturbed). At the time of parity rebuilding after the replacement of the disk, it is necessary to read data from all of disks that belongs to a parity group, other than the replaced disk. Thus, access performance is normally degraded. When the number of data drives is increased in a configuration such as the RAIDs constituting the parity group, the performance will be further degraded.

FIG. 10 is a schematic diagram showing a typical configuration example of a conventional disk array system. Referring to FIG. 10, an access module 14 serves as an interface for transmitting and receiving a command, data, and a control signal between a host 20 and a disk array. A RAID module 13 is constituted from the RAID controller and management software, and performs a read/write, fault detection, processing for disk rebuilding, and the like on data on a plurality of disks $11_1$ to $11_n$ of a redundant configuration. A disk access bus 12 provides connecting paths between a plurality of disk drives $11_1$ to $11_n$ and the RAID controller 13. Incidentally, rebuilding of a disk drive is performed on the array of the redundant configuration such as the RAID 1, 5, or 10. Each of the disk drives $11_1$ to $11_n$ is constituted from the disk drive such as an HDD (Hard Disk Drive), and is abbreviated as a "disk".

Patent Document 1 discloses a configuration in which in order to suppress further degradation of the performance when a number of data drives n is increased in an nD+1P representing a disk configuration such as the RAID constituting the parity group, copying is performed from one disk regardless of the number n. Patent Document 2 describes rebuilding (rebuilding) onto a disk by the RAID controller. A rebuild rate (Rebuild Rate) of a failed disk of 100% means that the system is all applied to the rebuilding of the failed disk. The rebuild rate of 0% means that the system performs rebuilding of the failed disk during an idle time when the system performs no other operation. A default rebuild rate is set to approximately 30% or the like, for example.

[Patent Document 1]
JP Patent Kokai Publication No. JP-P2002-108571A
[Patent Document 2]
JP Patent Kokai Publication No. JP-P2004-38290A

SUMMARY OF THE DISCLOSURE

In a redundant disk array system having a RAID level 5 or the like, data in a failed disk (replacement disk) is prepared using disks other than the failed disk at the time of disk rebuilding, it takes time to perform the rebuilding. With an increased capacity of disks in particular, the time for the rebuilding is increased. Further, during the rebuilding, a redundancy level is reduced. The access performance of the disk array system during the period of the rebuilding is thus degraded.

Accordingly, it is an object of the present invention to provide a disk array system and a method that achieve a higher speed operation for rebuilding of a replacement disk and shorten a period during which the redundancy level is reduced.

Other object of the present invention is to provide a disk array system and a method that suppress degradation of access performance during preparation of data on a replacement disk.

The above and other objects are attained by the present invention which is generally configured as follows.

A system according to one aspect of the present invention includes a backup device for backing up data in the disk array system, and restoration of data in a replacement disk drive is performed using the backup device. Other disk drives constituting the disk array system are not thereby used for the restoration.

A disk array system according to the present invention comprises: a plurality of disk drives constituting a disk array; a backup storage device; a backup module for performing control so that data in said disk array is backed up onto said backup storage device; and a rebuild module for performing rebuilding of data in a replacement disk drive, with which a failed disk drive among said disk drives constituting said disk array is replaced, based on the data backed up in said backup storage device.

A storage control device according to another aspect of the present invention comprises: a plurality of storage units; a backup device provided for said storage units; backup means for performing control so that data in said storage units is backed up onto said backup device; and control means for performing control so that when a failed storage unit among said storage units is replaced with a replacement storage unit, rebuilding of data in a replacement storage unit is performed based on the data backed up in said backup device.

A method according to another aspect of the present invention, comprises:

backing up data in a disk array including a plurality of disk drives onto a backup storage device which is provided separately from said disk array, and performing control so that restoration of data in a replacement disk drive at a time of replacement of a failed disk drive among the disk drives constituting the disk array is performed by the backup storage device.

In the present invention, it may be so arranged that when the data is updated by an access from a host, the information of update location is recorded on a modify map (also referred to as a "differential map"). Only the update portion updated after the backup onto the backup storage device may be sent to the backup storage device, and the backup storage device may back up the changed portion.

In the present invention, the data stored in the failed disk drive may be read from the backup storage device and written to the replacement disk drive. Then, after writing of the backup data in the failed disk drive to the replacement disk drive from the backup storage device is finished, the modify map may be referred to and data in a data block on the failed disk drive updated after the backup may be generated, based on the data on other disk drives, and the generated data may be written to the replacement disk drive.

In the present invention, the modify map may be referred to, and writing back from the backup storage device may not be performed on an updated data block of the failed disk drive.

In the present invention, an update performed on the disk drive corresponding to the failed disk drive during rebuilding may be directly written to the replacement disk drive without being backed up by the backup storage device.

In the present invention, even before the rebuilding is finished, with respect to a data block that has become the latest data among data blocks of the replacement disk drive under the rebuilding, access to the replacement disk drive may be authorized.

In the present invention, a disk access bus/switch for data transfer between said backup storage device and said replacement disk drive is provided and the rebuilding of said replacement disk drive from said backup storage is performed through the rebuild module provided in parallel with a RAID module for performing a normal read/write access to said disk array and said disk access bus/switch, thereby said rebuilding operation of said replacement disk drive being prohibited from influencing a normal access by said RAID module said to said disk array.

The meritorious effects of the present invention are summarized as follows.

According to the present invention, except for data updated after backup, other disk drive in a disk array is not accessed during rebuilding. Thus, degradation in performance will not be caused during the rebuilding.

According to the present invention, the degradation in the performance does not occur during the rebuilding. Accordingly, the rebuilding does not need to be performed at a low speed. For this reason, a rebuilding period can be reduced. Then, according to the present invention, due to a reduction in the rebuilding period, a probability of occurrence of a failure in a second disk during the rebuilding can be reduced.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Preferred embodiments of the present invention will be described with reference to appended drawings. In the present invention, a backup device is prepared for a plurality of storage units. Data in the storage units is backed up by the backup device. Rebuilding of data in a replacement storage unit at a time of replacement of a failed storage unit of the storage units is performed, based on the data backed up by the backup device. Preferably, the storage units in an embodiment of the present invention constitute a disk array.

Figure 1:
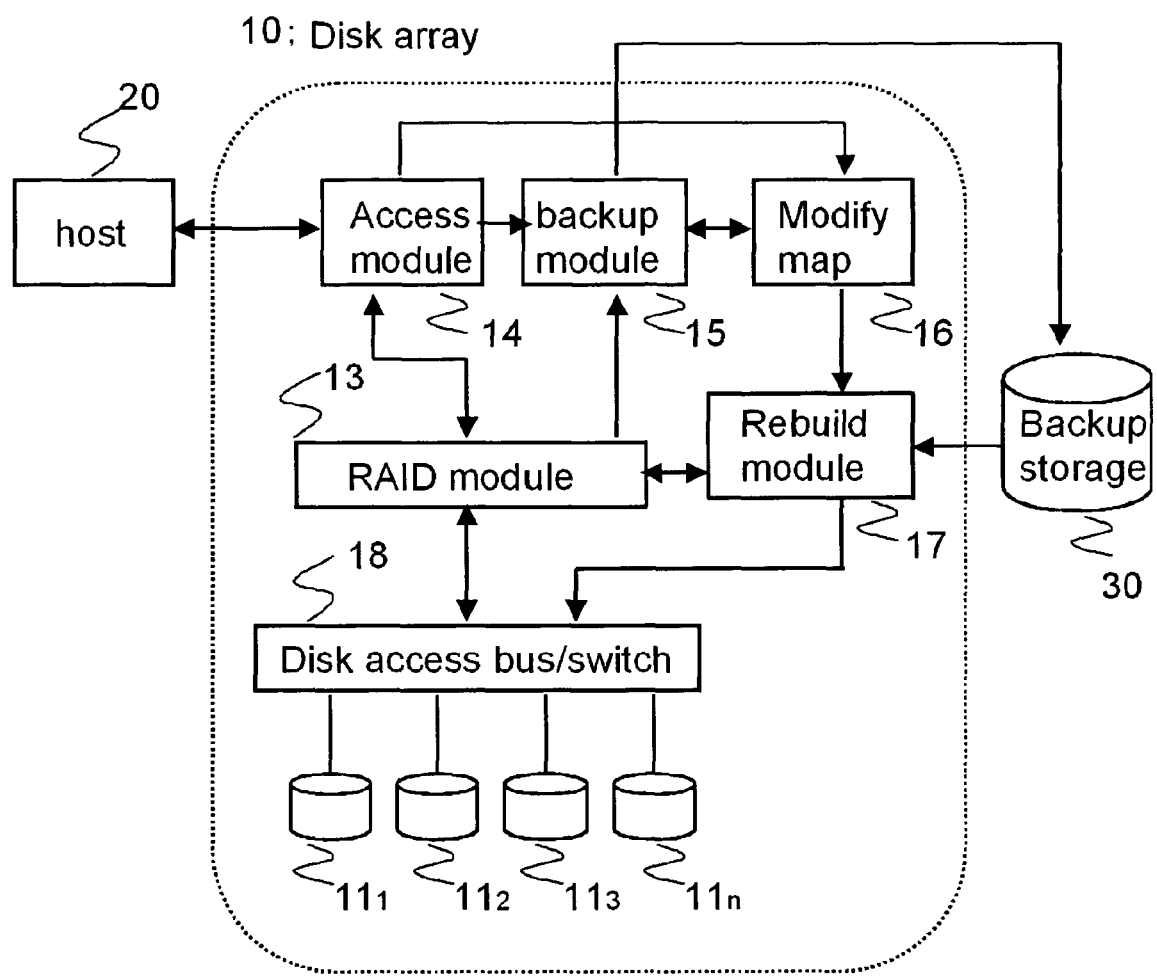
FIG. 1 is a diagram showing a configuration of an embodiment of the present invention.

FIG. 1 is a diagram showing a system configuration according the embodiment of the present invention. Referring to FIG. 1, a disk array 10 includes a plurality of disk drives $11_1$ to $11_n$, disk access bus/switch 18, a RAID module 13, an access module (host adapter) 14, a backup module (Backup Module) 15, a modify map (Modify Map) 16, and a rebuild module (Rebuild Module) 17. The RAID module 13 and the rebuild module 17 make access for writing to and reading from a plurality of disks through the disk access bus/switch 18. A backup storage 30 is connected to the disk array 10 through a predetermined interface. The backup storage 30 may be of course configured to be the disk array. Each of the disk drives $11_1$ to $11_n$ is constituted from the disk drive such as an HDD (Hard Disk Drive), and is simply abbreviated as a "disk".

In the present invention, the backup module 15 periodically backs up data in the disks $11_1$ to $11_n$ constituting the disk array onto the backup storage 30. When the access module 14 receives a backup command from a host 20, the backup module 15 reads data from one of the disk drives $11_1$ to $11_n$ through the RAID module 13 (and error detection and correction processing including a parity check and the like is performed) and writes read data in the backup storage 30.

When modification of a data block is performed within a period from a start of backup processing by the backup module 15 or from completion of the backup processing to next backup, the access module 14 sets in a modify map 16 information (of one bit) indicating that the modification of the data block has been performed. The modify map 16 may be configured to include an update bit (update bit) of one bit and a rebuild bit (rebuild bit) per logical block (of 1 K byte, for example), for each disk (of which a description will be described later with reference to FIG. 9). Alternatively, the modify map 16 may be configured to include the update bit of one bit per extent. The modify map 16 is stored in a memory module such as a DRAM (dynamic random access memory) or an EEPROM (electrically erasable programmable ROM) that is a nonvolatile memory for holding recorded data even at a time of power off.

Assume that one of the disks constituting the disk array has failed, the failed disk is replaced with a spare disk or the like, and that data is rebuilt onto the replacement disk in this embodiment mode. Then, it is preferable that transfer of the data from the backup storage 30 to the replacement disk is performed through the rebuild module 17 and the disk access bus/switch 18 so as not to influence a normal access from the host 20 to other disk. That is, the normal access from the host 20 to other disk is performed through the access module 14, RAID module 13, and disk access bus/switch 18. Processing for the rebuilding from the backup storage 30 is performed through the rebuild module 17 provided in parallel with the RAID module 13 and the disk access bus/switch 18. A Port for a cross bus switch or the like constituting the disk access bus/switch 18 may be different between the RAID module 13 and the rebuild module 17. Alternatively, different access buses constituting the disk access bus/switch 18 may be provided for the RAID module 13 and the rebuild module 17, respectively. With this arrangement, influence of the processing for the rebuilding on the normal access is suppressed as much as possible. Details of an operation of a disk array system shown in FIG. 1 will be described in connection with embodiments below.

Embodiment

Figure 2:
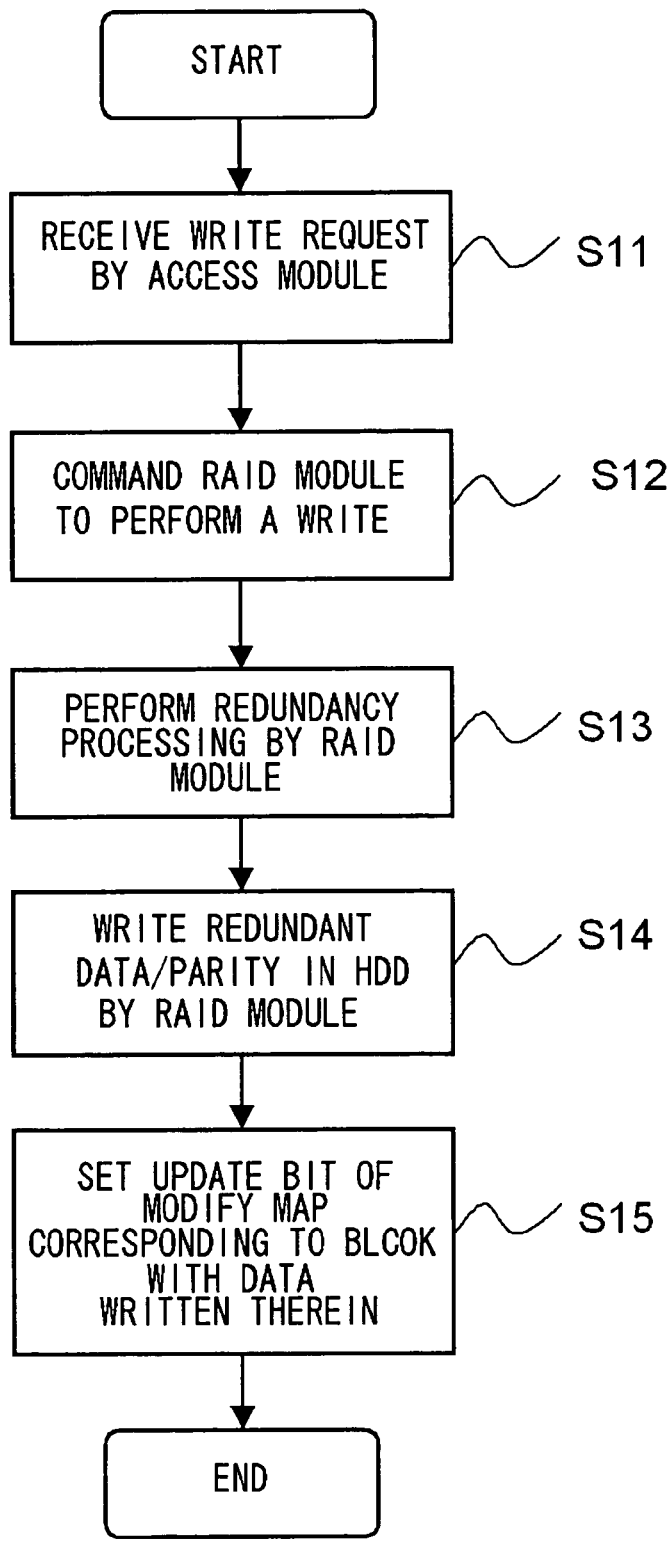
FIG. 2 is a flow diagram for explaining WRITE processing at a normal time in the embodiment of the present invention.

FIG. 2 is a flow diagram for explaining write processing at a normal time in this embodiment. The access module 14 receives a WRITE (write) request from the host 20 (at step S11). Incidentally, though no particular limitation is imposed, the HDD (Hard Disk Drive) is employed for each of the disks $11_1$ to $11_n$ of FIG. 1 in FIGS. 2 through 8.

The access module 14 commands the RAID module 13 to perform a WRITE (transmits the WRITE command) (at step S12).

The RAID module 13 performs redundancy processing (parity generation) of data at a parity generator not shown (at step S13).

The RAID module 13 writes data and a parity which have been made redundant into a disk (HDD) (at step S14).

The access module 14 sets the update bit (update bit) of the modify map 16 corresponding to the logical block with data written therein (at step S15).

Figure 3:
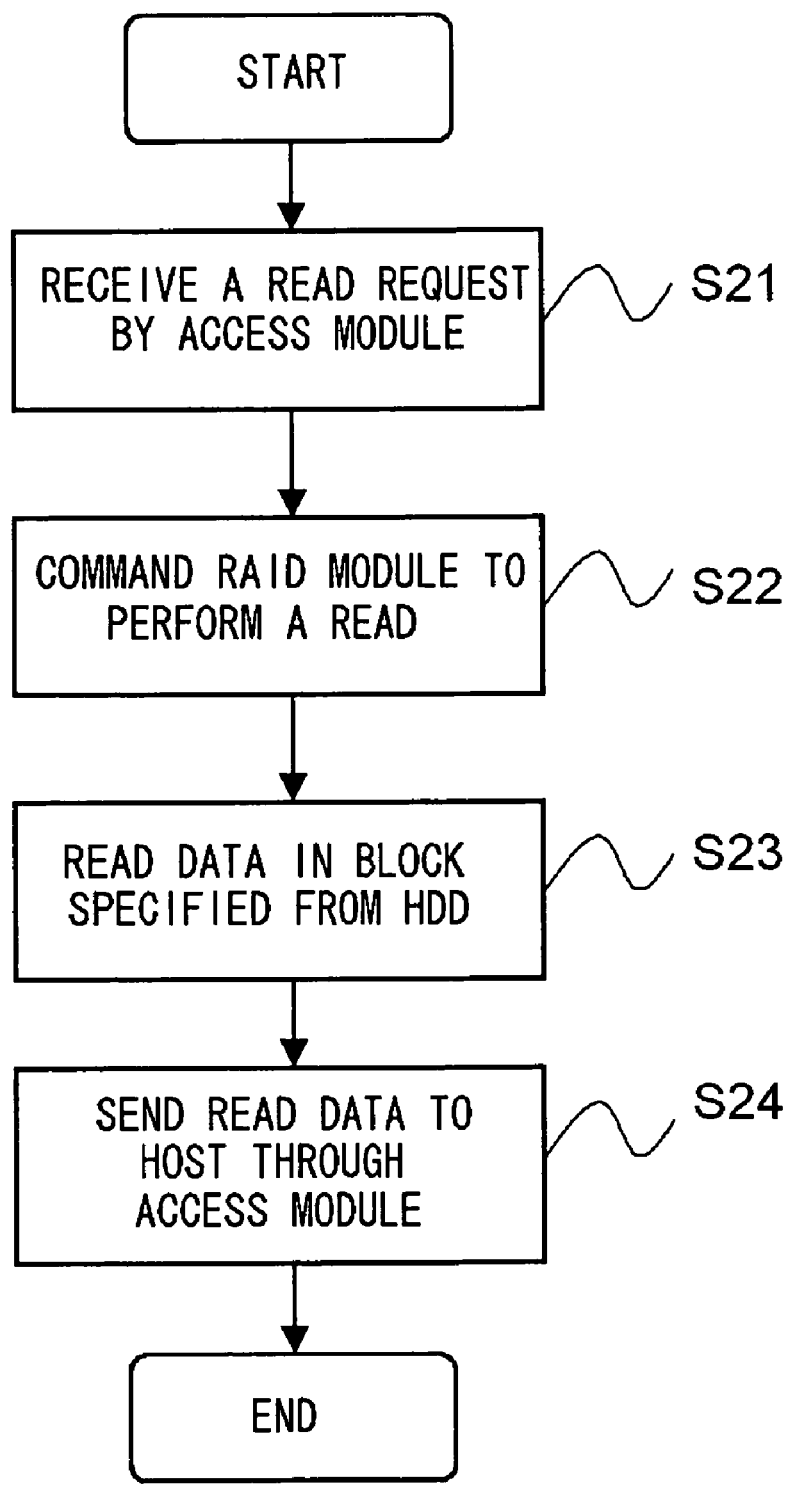
FIG. 3 is a flow diagram for explaining READ processing in the embodiment of the present invention.

FIG. 3 is a flow diagram for explaining READ processing at a normal time in this embodiment. The access module 14 receives a READ (read) request from the host 20 (at step S21).

The access module 14 commands the RAID module 13 to perform a READ (transmits a READ command)(at step S22).

The RAID module 13 reads data in a logical block specified from a disk (HDD) and transfers the data to the access module 14 (at step S23).

The access module 14 transmits the data read from the disk array to the host 20 (at step S24).

Figure 4:
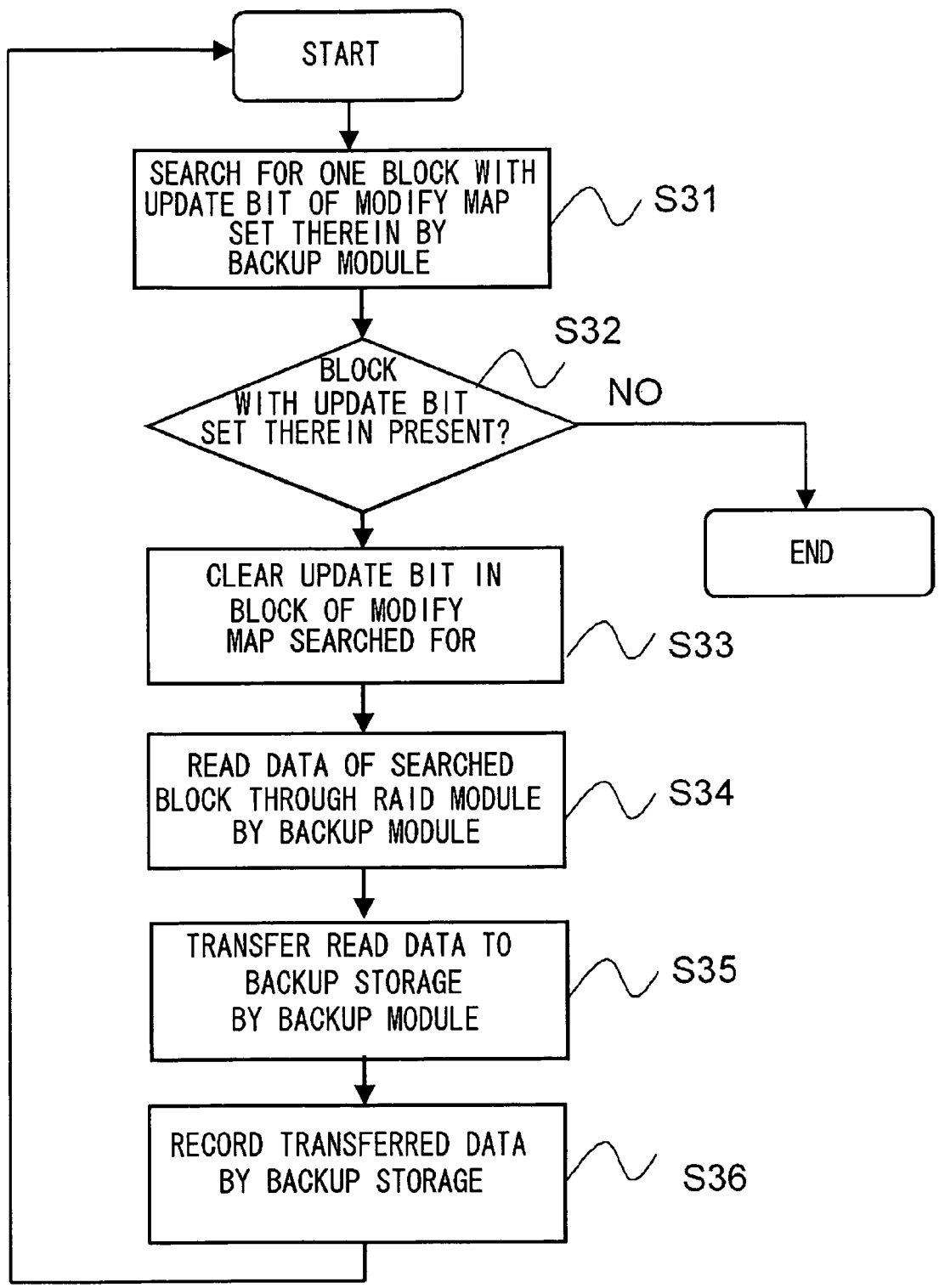
FIG. 4 is a flow diagram for explaining differential backup processing in the embodiment of the present invention.

FIG. 4 is a flow diagram for explaining differential backup processing in this embodiment. Differential backup is the processing for selectively backing up only a portion (such as a logical block) which has been updated after backup processing. The differential backup processing will be described below.

The backup module 15 searches for the logical block of the modify map 16 with the update bit set therein (at step S31).

When the logical block of the modify map 16 with the update bit (Update bit) set therein is present, the following processing is repeated (at step S32).

The update bit (Update bit) in the logical block of the modify map 16 searched for is cleared (at step S33). Clearing of the update bit indicates that updating has been performed.

The backup module 15 reads data in the searched logical block through the RAID module 13 (at step S34).

The backup module 15 transfers the read data in the block to the backup storage 30 (at step S35).

The backup storage 30 records the transferred data (at step S36).

Figure 5:
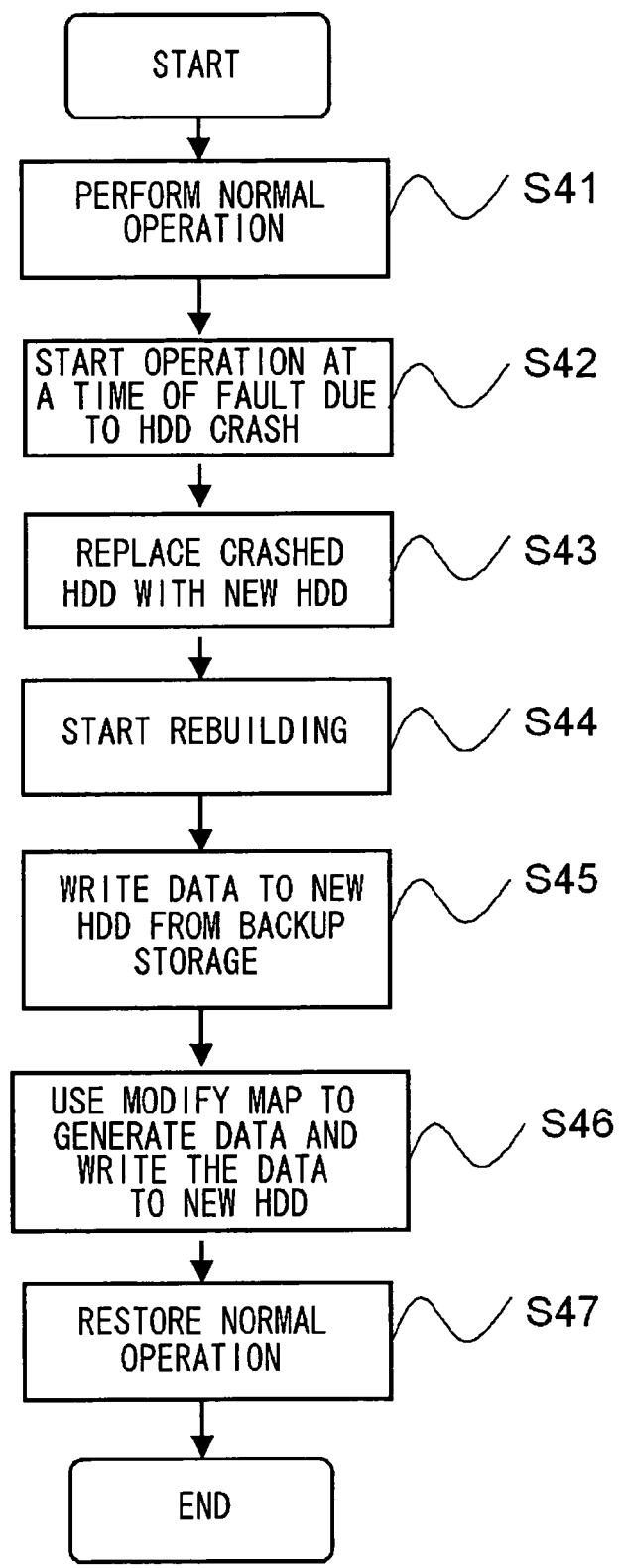
FIG. 5 is a flow diagram for explaining processing before and after a crash in the embodiment of the present invention.

FIG. 5 is a flow diagram for explaining processing before and after a disk (HDD) has been crashed.

Due to occurrence of the crash in the disk (HDD) at a normal operation, an operation at a time of a fault is started (at step S42).

The crashed disk (HDD) is replaced with a new disk (HDD) (at step S43). Incidentally, the new disk may be a spare disk prepared for in the disk array. Further, the RAID module 13 may automatically perform replacement of a disk from which the fault has been detected or replacement of a failed disk to the spare disk.

Rebuilding of the replacement disk is started by the rebuild module 17 (at step S44).

Data is written to the replacement disk (new HDD) from the backup storage 30 (at step S45).

Using the modify map (Modify Map) 16, data in the logical block with the update bit set therein is generated, and the generated data is written to the replacement disk (new HDD) (at step S46). For generation of the data in the logical block, the data (or the parity thereof) is generated from data in disks other than the replacement disk among disks constituting the disk array and written to the replacement disk, by referring to information (striping information on parity blocks and the data) in the RAID module 13.

The rebuilding of the replacement disk is completed, and restoration to the normal operation is performed (at step S47).

Figure 6:
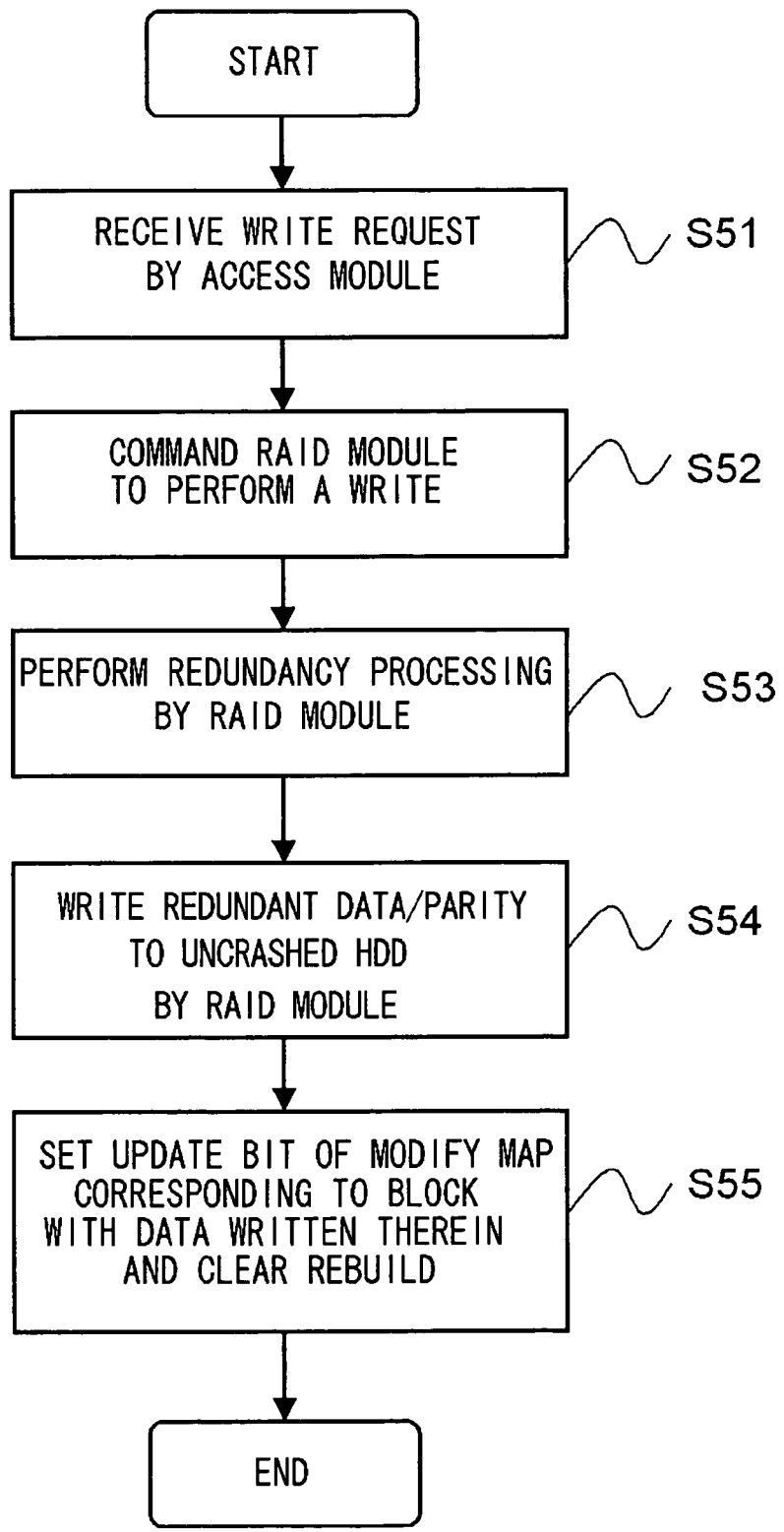
FIG. 6 is a flow diagram for explaining WRITE processing from the crash to completion of rebuilding in the embodiment of the present invention.

FIG. 6 is a flow diagram for explaining WRITE processing from occurrence of a crash of a disk to completion of rebuilding. In this case, data writing to disks other than the failed disk is performed, and write data is not backed up. Thus, the update bit (Update bit) of the modify map is set.

The access module 14 receives a WRITE request from the host 20 (at step S51).

The access module 14 commands the RAID module 13 to perform a WRITE (at step S52).

The RAID module 13, which has received the WRITE command, performs redundancy processing (at step S53).

The RAID module 13 writes data/parity that has been made redundant to uncrashed disks (HDD) (at step S54).

The access module 14 sets in the modify map 16 the update bit (Update bit) corresponding to the logical block with the data written therein, and resets (clears) the rebuild bit (Rebuild bit) for the logical block (at step S55).

Figure 9:
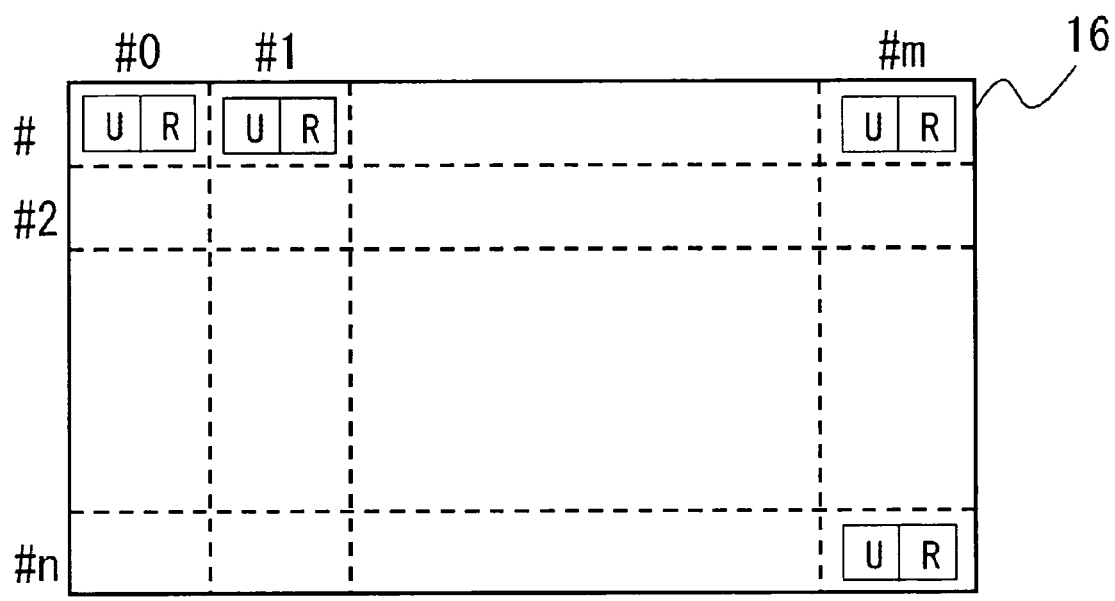
FIG. 9 is a diagram showing a configuration example of update bits.
Figure 10:
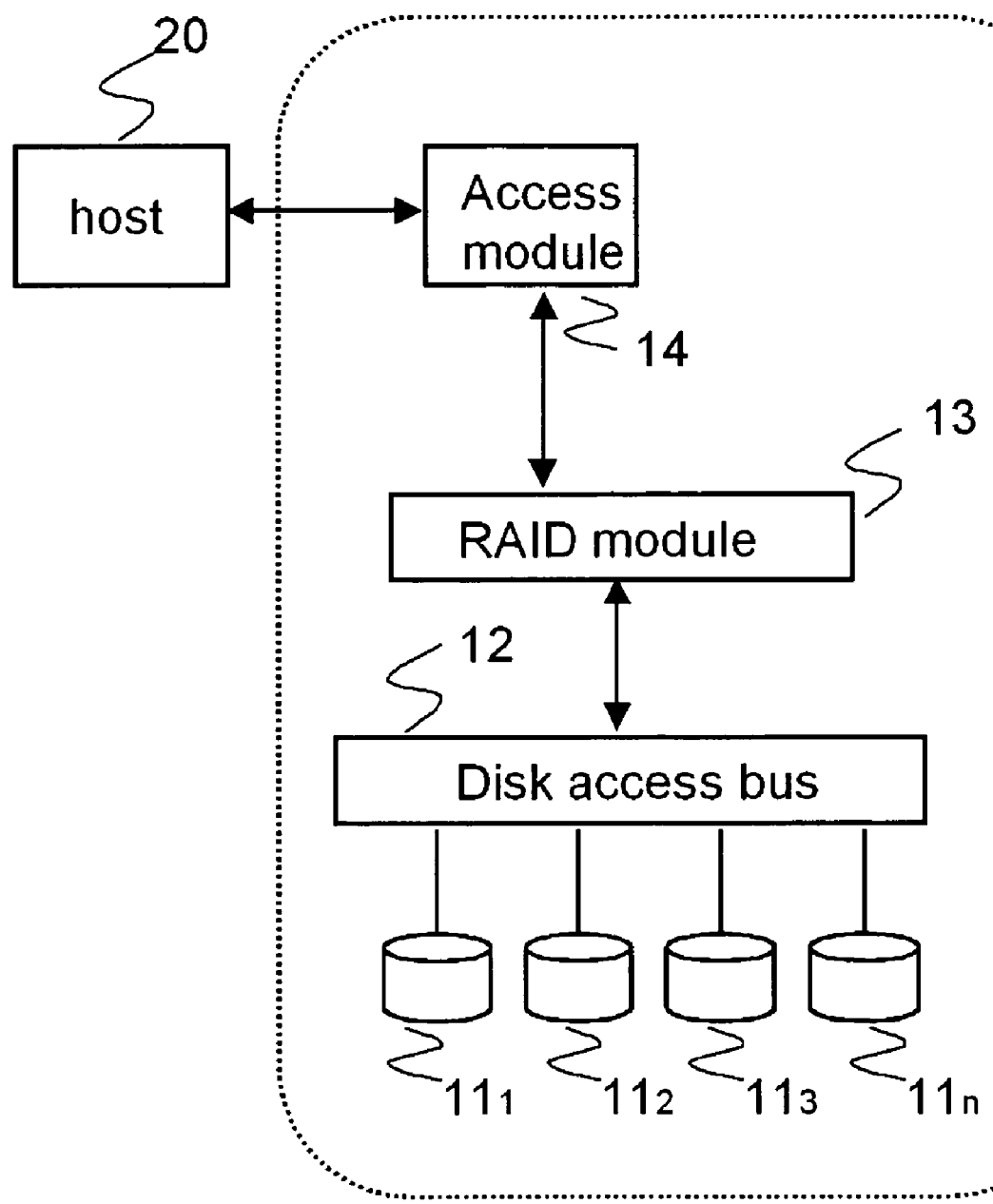
FIG. 10 is a diagram showing a typical configuration of a conventional disk array.

FIG. 9 is a diagram showing an arrangement example of update bits (Update bits) and rebuild bits (Rebuild bits) in the modify map 16. Each of the update bits (U) and each of the rebuild bits (R) are assigned to a logical block (of 1K byte), and (m+1)×n update and rebuild bits are assigned to n disk drives. A cache structure may be of course adopted for the modify map 16. Contexts of the modify map 16 are reset when a system operation is started or the like. The contexts of the modify map 16 may be saved on a disk or the like at power-off of the system. Alternatively, the modify map may be constituted from the EEPROM or the like.

Figure 7:
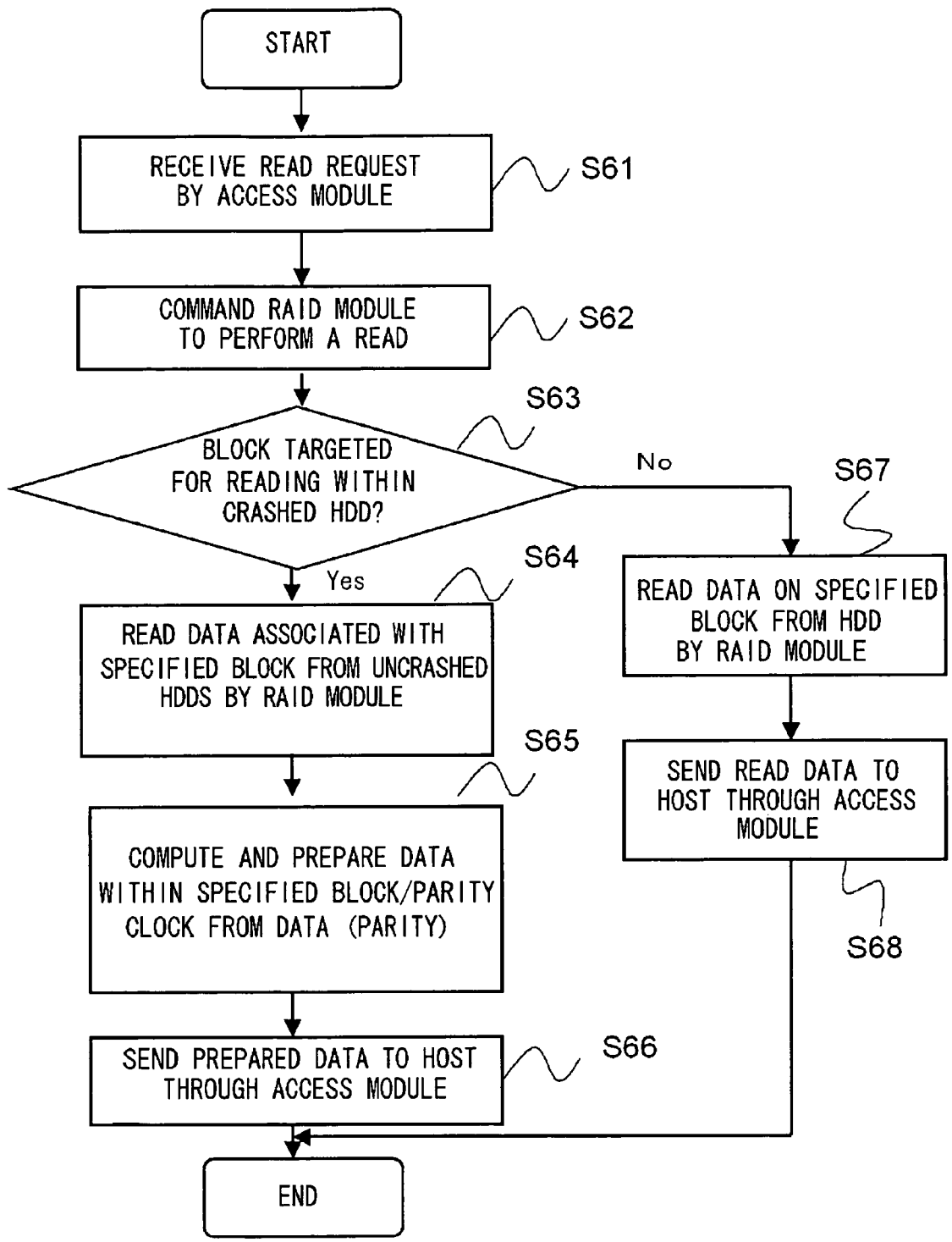
FIG. 7 is a flow diagram for explaining READ processing from the crash to completion of rebuilding in the embodiment of the present invention.

FIG. 7 is a flow diagram for explaining READ processing from occurrence of a crash in a disk to completion of rebuilding of a replacement disk (a new HDD) in this embodiment.

The access module 14 receives a READ request from the host 20 (at step S61).

The access module 14 commands the RAID module 13 to perform a READ (at step S62).

It is determined whether a block targeted for reading is in a crashed disk (HDD) or not (at step S63).

When it is determined that the block targeted for reading is inside the crashed disk (HDD), the RAID module 13 reads data associated with the specified block from uncrashed disks (at step S64).

The RAID module 13 computes and prepares data in the specified block/parity block from the data (parity) associated with the specified block (at step S65).

The RAID module 13 sends to the host 20 prepared data through the access module 14 (at step S66).

On the other hand, when it is determined that the block targeted for reading is not in the crashed disk (HDD) at step S63, the RAID module 13 reads the data in the specified block (at step S67) and sends to the host 20 the read data through the access module 14 (at step S68).

Figure 8:
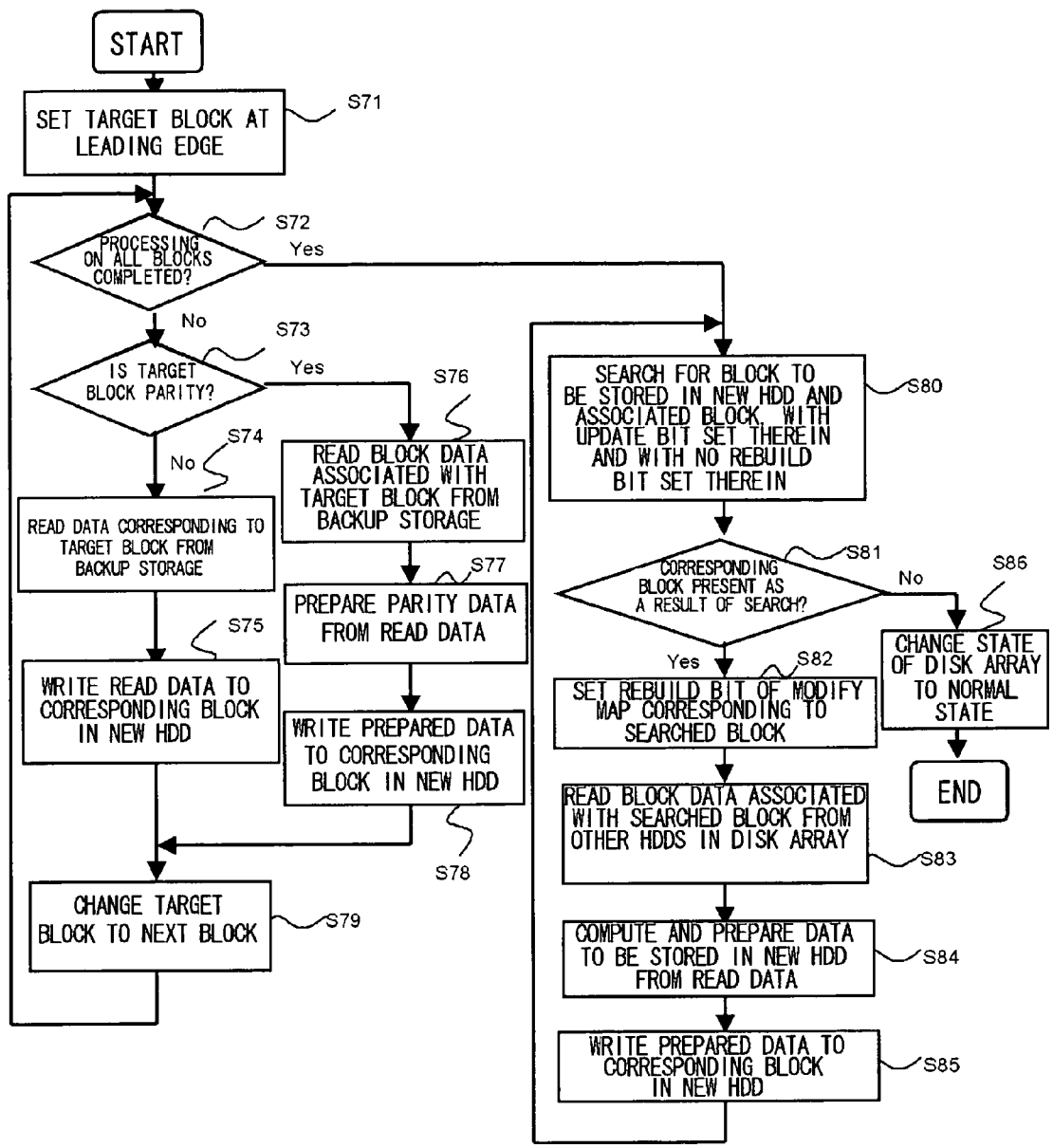
FIG. 8 is a flow diagram for explaining processing for rebuilding in the embodiment of the present invention.

FIG. 8 is a flow diagram for explaining processing for rebuilding by the rebuild module 17 in this embodiment. The processing by the rebuild module 17 will be described below with reference to FIG. 8.

The rebuild module 17 sets a target block (logical block) in a disk targeted for rebuilding at a leading edge of the disk (at step S71).

The rebuild module 17 repeats the following processing until processing on all blocks (blocks) is completed (at step S72).

It is determined whether the target block is the parity block or not at step S73. The rebuild module 17 determines whether the target block in the replacement disk (new HDD) targeted for rebuilding is the parity block or not, by referring to management information (not shown) held in the RAID module 13, for example.

When it is determined that the target block is not the parity block in the determination at step S73, the rebuild module 17 reads data corresponding to the target block from the backup storage 30 (at step S74).

The rebuild module writes the data read from the backup storage 30 to the corresponding block (target block) in the replacement disk (new HDD)(at step S75).

Next, the rebuild module 17 changes the target block to the next block (at step S79).

When it is determined that the target block is the parity block at the determination at step S73, the rebuild module 17 reads data in a logical block associated with the target block from the backup storage 30 (at step S76). In this embodiment, the parity block in the disk array is not stored in the backup storage 30 as the backup data at a time of backup. For this reason, when it is determined as a result of the determination at step S73 that the target block to be written to the replacement disk (new HDD) is the parity block, the rebuild module 17 reads block data in other disks (disks other than the replacement disk, which constitutes the array) that constitutes the disk array, associated with the target block, from the backup storage 30.

Then, the rebuild module 17 generates the parity data to be stored in the target block from the data read from the backup storage 30 (block data in other disk associated with the target block) (at step S77).

Next, the rebuild module 17 writes the generated parity data to the corresponding block (target block) in the replacement disk (new HDD) (at step S78).

When it is determined that processing on all blocks is completed in the determination at step S72, the rebuild module 17 searches for a block (block that has not been rebuilt yet) associated with the block stored in the replacement disk (new HDD) with the update bit (update bit) set therein and with no rebuild bit (rebuild bit) set therein (at step S80). That is, the rebuild module 17 searches for the block that has been modified and has not been rebuilt yet after the start of the backup.

When the pertinent block exists after a result of the search (Yes at step S81), the rebuild module 17 sets the rebuild bit (rebuild bit) of the modify map 16 corresponding to the searched block (at step S82). Setting of the rebuild bit (rebuild bit) of the logical block in the modify map 16 indicates that rebuilding of the logical block onto the replacement disk has been completed.

The rebuild module 17 reads from other disks (HDDs) of the disk array block data associated with the block that has been searched for (at step S83).

From the data read from the other disks (HDDs), the rebuild module 17 computes and prepares data to be stored in the replacement disk (new HDD) (at step S84).

The rebuild module 17 writes the prepared data to the replacement disk (new HDD) (at step S85).

When it is found that no block with the update bit (update bit) set and with no rebuild bit (rebuild bit) set therein is present at step S81, the rebuild module 17 changes the state of the disk array to a normal state (at step S85).

An operation of this embodiment was described below. Some of variation examples of the embodiment will be described below.

It may also be so arranged that the rebuild module 17 refers to the modify map 16 and does not write back an updated block (block with the update bit (update bit) set therein) among blocks of a failed disk (new HDD), to the replacement disk (new HDD) from the backup storage 30. It is because, as the updated block, data generated from other disks (HDDs) of the disk array is written, as shown in steps S83 through S85 in FIG. 8, for example.

In another variation example, an update to the failed disk during rebuilding of the replacement disk (new HDD) may also be written to the replacement disk (new HDD) without alteration. When the access module 14 receives a WRITE request from the host 20 during execution of the rebuilding by the rebuild module 17, the WRITE command is issued to the RAID module 13, and writing to the replacement disk (new HDD) is performed through the RAID module 13. The latest data will be written to the block of the replacement disk (new HDD) after backup processing. Thus, the access module 14 does not set the update bit (update bit) of the modify map. On the other hand, the rebuild bit of the block may be set. For this reason, rebuilding of the data on the block from the backup storage 30 by the rebuild module 17 is omitted (as in an operation branched to NO in the determination at step S81 in FIG. 8).

In another variation example, with respect to access to the latest data among block data of the replacement disk (new HDD) being rebuilt, access to the replacement disk (new HDD) may be authorized even before completion of the rebuilding. With respect to the block with the rebuild bit of the modify map 16 set therein (with the update flag reset therein, however), the access module 14 performs control so that access to the replacement disk (new HDD) is permitted in response to an access request from the host 20.

Incidentally, the backup storage 30 may be of course a recording medium (such as a tape) other than the disk (HDD) in the embodiment described above. The backup storage 30 may be installed in a remote location connected through the network.

A fibre channel fabric switch or a cross bus switch may be employed as the disk access bus/switch 18 in FIG. 1. In the case of a configuration described above, access to a replacement disk (new HDD) and access to other disk can be non-blocked. Alternatively, a dual Fibre channel arbitrated loop may be used as the disk access bus/switch 18 in FIG. 1. One loop may be used for access to the replacement disk (new HDD), and the other may be used for access to other disk (HDD). In the case of such a configuration as well, access to the replacement disk and access to other disk can be non-blocked.

A description was made in connection with the embodiment described above. The present invention is not limited to the configuration of the embodiment described above, and may of course include various variations and modifications that could be made by those skilled in art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A disk array system comprising:
    a plurality of disk drives constituting a disk array;
    a RAID module for performing a normal read/write access to the disk array;
    a backup storage device;
    a backup module for reading data from said disk array and writing the read data onto said backup storage device;
    a replacement disk drive for replacing one of the plurality of disk drives after one of the plurality of disk drives fails;
    a rebuild module for performing rebuilding of data on the replacement disk drive based on the data backed up in said backup storage device; and
    means for rebuilding data on the replacement disk drive from the backup storage device through the rebuild module while simultaneously providing normal read/write access to the disk drives that have not failed through the RAID module.

2. The disk array system according to claim 1, further comprising a modify map for recording information corresponding to an update location, when the data in said disk array is updated.

3. The disk array system according to claim 2, wherein, when the data in said disk array is updated by an access from a host after the backup onto said backup storage device, said backup module sends to said backup storage device the data updated after the backup onto said backup storage device, said modify map records the information corresponding to the updated data; and said data updated after backup is stored as the backup data in said backup storage device.

4. The disk array system according to claim 3, wherein said rebuild module reads from said backup storage device data stored in said failed disk drive and backed up in said backup storage device, writes the data to said replacement disk drive; and after the completion of writing of the data in said failed disk drive to said replacement disk drive from said backup storage device, said rebuild module refers to said modify map, and generates data for said failed disk drive which have been updated after the backup, based on the data on other disk drives constituting said disk array, to write the generated data to said replacement disk drive.

5. The disk array system according to claim 2, wherein said modify map has an update flag corresponding to a unit region for access in each of said disk drives in said disk array, the update flag indicating whether the unit region has been updated or not after the backup.

6. The disk array system according to claim 5, wherein said modify map has a rebuild flag corresponding to the unit region for access in said each of said disk drives in said disk array, the rebuild flag indicating whether rebuilding of the unit region has been performed or not.

7. The disk array system according to claim 6, wherein said rebuild module refers to said modify map after the completion of writing of the data in said failed disk drive to said replacement disk drive from said backup storage device, and generates data on the unit region with the update flag indicating updating and with the rebuild flag indicating that the rebuilding has not been performed yet, based on the data in other disk drives constituting said disk array, to write the generated data to said replacement disk drive.

8. The disk array system according to claim 1, wherein said rebuild module refers to a modify map, and performs control so that writing back from said backup storage device to said replacement disk drive is not performed on a unit region of the failed disk drive updated after the backup.

9. The disk array system according to claim 1, wherein an update to the failed disk during rebuilding of the replacement disk is written to the replacement disk drive without alteration.

10. The disk array system according to claim 1, wherein, even before the rebuilding is finished, when an access request is made to latest data among the data in said replacement disk drive under the rebuilding, access to said replacement disk drive is permitted.

11. The disk array system according to claim 1, further comprising:
    a disk access bus/switch for providing the RAID module and the rebuild module with parallel access to the disk array and the replacement disk, respectively;
    wherein the rebuilding of said replacement disk drive from said backup storage is performed through said rebuild module and said disk access bus/switch, thereby the rebuilding of said replacement disk drive being prohibited from influencing a normal access by said RAID module to said disk array.

12. The disk array system according to claim 1, wherein the rebuild module and the RAID module are separate from each other.

13. A method of rebuilding a disk array system, said method comprising:
    backing up data in a disk array including a plurality of disk drives onto a backup storage device; and
    when a failed disk drive among said disk drives constituting said disk array is replaced with a replacement disk drive, rebuilding data in said replacement disk drive from the backed-up data in the backup storage device while simultaneously providing other devices with access to the disk drives that have not failed.

14. The method according to claim 13, further comprising:
recording information corresponding to an update location, when the data in said disk array is updated by an access from a host after the backup onto said backup storage device;
sending only the updated data to said backup storage device after the backup onto said backup storage device; and
storing the updated data in said backup storage device as the backup data.

15. The method according to claim 14, further comprising:
reading from said backup storage device data stored in said failed disk drive and backed up in said backup storage device, and writing the data to said replacement disk drive; and
referring to a modify map, after writing of the data in said failed disk drive to said replacement disk drive from said backup storage device is finished, generating data on said failed disk drive updated after the backup, based on the data on other disk drives constituting said disk array and writing the generated data to said replacement disk drive.

16. The method according to claim 14, wherein a modify map has an update flag corresponding to a unit region for access in each of said disk drives in said disk array, the update flag indicating whether the unit region has been updated or not after the backup.

17. The method according to claim 16, wherein said modify map has a rebuild flag corresponding to the unit region for access in said each of said disk drives in said disk array, the rebuild flag indicating whether rebuilding of the unit region has been performed or not.

18. The method according to claim 17, further comprising:
referring to said modify map, after writing of the data in said failed disk drive to said replacement disk drive from said backup storage device is finished; generating data on the unit region with the update flag indicating updating and with the rebuild flag indicating that the rebuilding has not been performed yet, based on the data in other disk drives constituting said disk array; and writing the generated data to said replacement disk drive.

19. The method according to claim 13, the rebuilding data in said replacement disk further comprising
referring to a modify map and performing control so that writing back from said backup storage device is not performed on a unit region of the failed disk drive updated after the backup.

20. The method according to claim 13, further comprising performing control so that a content updated during the rebuilding of said replacement disk drive is written to said replacement disk drive without using said backup storage device.

21. The method according to claim 13, further comprising performing control so that even before the rebuilding is finished, when an access request is made to latest data among the data in said replacement disk drive under rebuilding, access to said replacement disk drive is permitted.

22. The method according to claim 13, further comprising:
providing a host with normal read/write access to the disk array in parallel with the access to the replacement disk drive for the rebuilding of data in the replacement disk.

* * * * *